United States Patent Office 2,987,016
Patented June 6, 1961

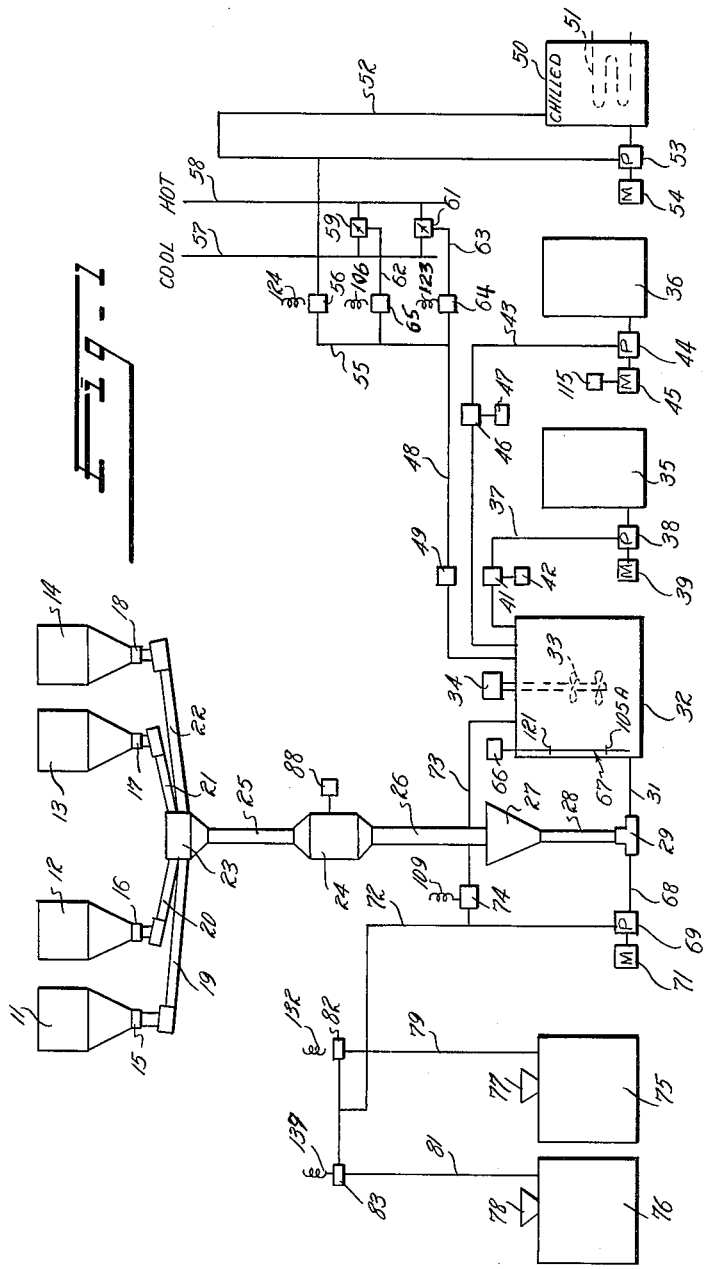

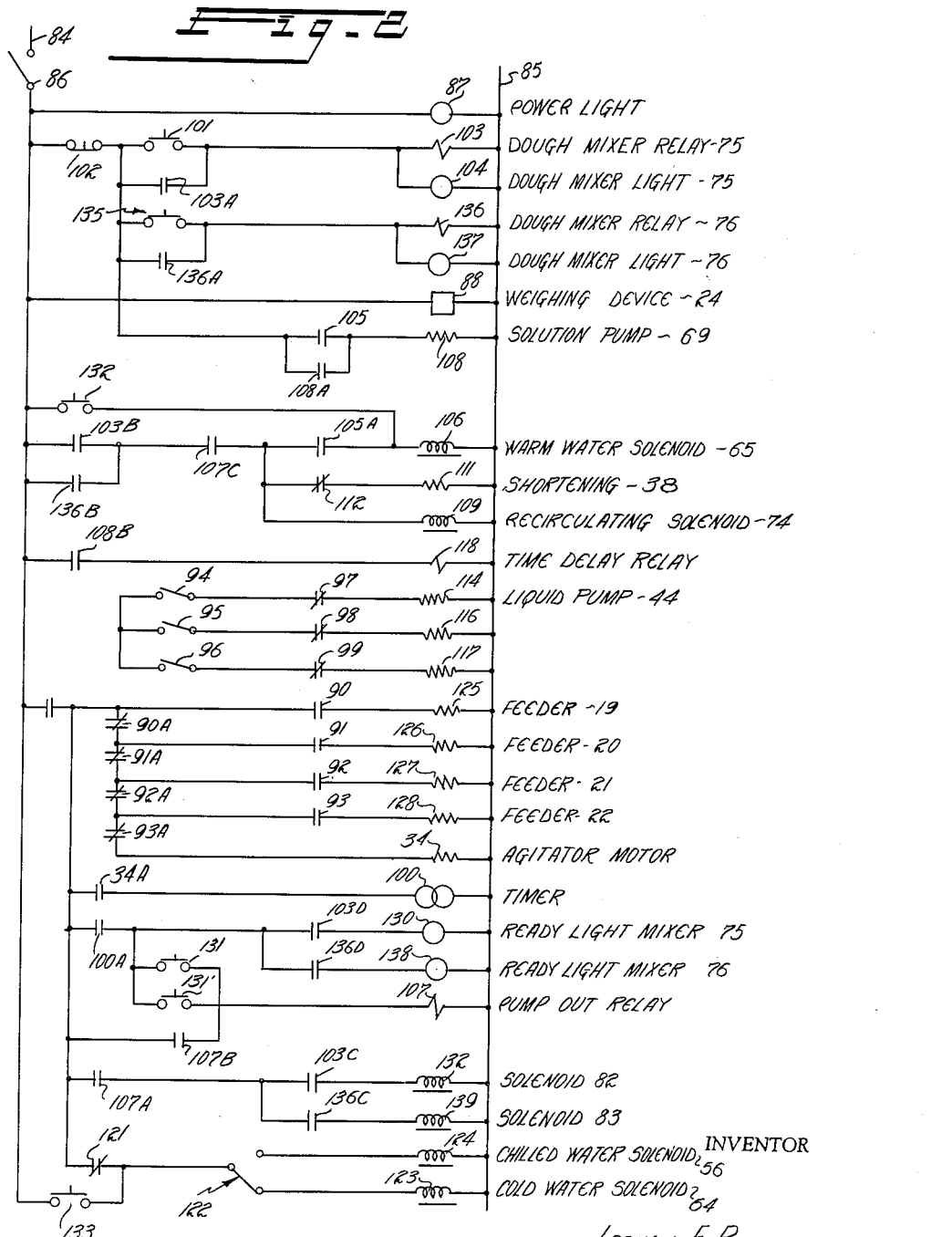

2,987,016
INGREDIENT HANDLING
Leonard F. Patridge, 244 Westchester Ave.,
Tuckahoe 7, N.Y.
Filed Nov. 14, 1955, Ser. No. 546,598
5 Claims. (Cl. 107—54)

This invention relates to processes for automatically handling and mixing liquid and dry ingredients and particularly to systems for properly proportioning and mixing ingredients for the production of bread dough and allied products.

Improvements in plant efficiency and sanitation are constantly sought in bakeries today to meet rising costs and satisfy regulations as to food handling. Automatic and pneumatic flour conveying and weighing apparatus has been devised but there has been little or no improvement over ingredient mixing arrangements that have been conventional for many years. For example, portable batch cans into which charges of the ingredients other than flour are weighed on scales are carried to the dough mixer and dumped by hand in most bakeries. This is unsanitary and often results in partial loss of ingredients so that the different mixtures are not uniform. Recent surveys show that bad flour dust conditions and unsanitary batch cans, weigh scales, bucket elevators, screw conveyors, sifters and even mixers are encountered due to spilling of manually handled ingredients even where the systems are partially mechanized. In most bakeries today all of the ingredeints except water and flour are separately mixed in the batch cans and the batch cans manually dumped into the individual dough mixers where water is added along with the necessary flour.

The invention contemplates elimination of costly and unsanitary present day procedures and the provision of a system wherein the ingredients are accurately weighed and mixed in a novel manner. Automatic controls are provided to insure accuracy and uniformity of the product, reduce labor costs, eliminate ingredient loss and improve sanitation. In the embodiment of my invention to be hereafter described, automatically measured proportions of dry and liquid ingredients including water are mixed in a recirculation cycle before being conveyed to the dough mixer.

It is therefore the major object of the invention to provide a novel process for accurately proportioning and mixing dry and liquid food ingredients.

A further object of the invention is to provide a novel ingredient mixing process for bakeries and the like wherein dry and liquid ingredients including water are thoroughly mixed before introduction into the dough mixer.

A further object of the invention is to provide a novel food ingredient recirculation mixing process.

Another object of the invention is to eliminate hand dumping of ingredient batches in bakeries and the like.

A further object of the invention is to provide a novel automatically controlled system for sequentially measuring and introducing accurate quantities of liquid and dry ingredients into a mixing apparatus and conveying the resultant mixture into the dough mixer to be combined with flour without manual handling of the ingredients.

It is an object of the invention to provide a novel process for mixing bakery product ingredients wherein the liquid ingredients including at least part of the water are thoroughly mixed and then gradually combined with the measured dry ingredients.

A further object of the invention is to provide a novel automatic process for mixing bakery product ingredients wherein measured quantities of all of the liquid ingredients are mixed with warm water and recirculated through a system including a mixing vessel, then cooler water is added to the mixture and at the same time measured quantities of the dry ingredients are gradually combined with the liquid mixture in the recirculation sysem to form a fluent slurry, then the slurry is drawn out of the mixing vessel and conveyed to a dough mixer where it is mixed with flour, and the balance of cooler water is fed into the mixing vessel during such withdrawal.

Further objects of the invention will appear as the description proceeds in connection with the appended claims and the annexed drawings wherein:

FIGURE 1 is a schematic view illustrating the process and apparatus according to a preferred mode of practicing the invention; and FIGURE 2 is a wiring diagram showing the automatic controls for the process and apparatus of FIGURE 1.

FIGURE 1 shows apparatus wherein all of the liquid ingredients for making bread dough including water are proportioned and mixed with the dry ingredients. The term dry ingredient is used here to include all of the dry components to be combined into the dough except flour. Shortening and like viscous materials which are heat softened to flowable condition are regarded as liquid within this meaning.

The selected dry ingredients are contained in a series of storage bins 11, 12, 13 and 14 which may be periodically or continuously replenished by means not concerned with the present invention. For example, bin 11 may contain cane sugar, bin 12 granular corn sugar, bin 13 common salt and bin 14 dry milk powder. Normally open flow control valves 15, 16, 17 and 18 are provided at the bottom of the respective bins for effecting and controlling the gravity flow of the dry ingredients to feeder assemblies 19, 20, 21 and 22 respectively that all discharge into a common chamber in accumulator 23. The feeders 19, 20, 21 and 22 are preferably vibratory type feeders of a conventional construction. The accumulator discharges by gravity into an automatic weigher assembly indicated at 24 which is connected (as will appear in FIGURE 2) to selectively control feeders 19—22.

In the process of the invention and as will be described later in more detail in connection with the control circuit of FIGURE 2, each dry ingredient is in turn automatically measured and introduced into the system. For example, to start, the weigh device at 24 is set in accord with the desired amount of cane sugar and feeder 19 is started at the proper time under control of the circuit of FIGURE 2 to permit flow of the sugar into accumulator 23 and down tube 25 to weighing device 24 which acts automatically to stop flow from feeder 19 when the required weight of sugar has been dispensed into weigher 24, and the measured component is automatically dumped through conveyor tube 26 into hopper 27.

This measuring and weighing operation is repeated for the corn sugar from bin 12, the salt from bin 13 and the milk powder from bin 14, weighing device 24 cutting off the supply feeders in turn when the preset amounts are reached and dumping the weighed components into hopper 27. In this manner accurately measured amounts of the dry ingredients for a mix (except flour) are discharged into a common hopper 27 untouched by human hands and unexposed to external conditions.

The bottom of hopper 27 is connected by a tubular shaft 28 with a dry and liquid ingredient combining device 29 that has a vertical passage connected to tube 28 intersecting a horizontal liquid flow passage connected by pipe 31 to the lower part of a tank 32. A propeller type agitator or homogenizer 33 is provided in tank 32 driven by an electric motor 34. The purpose of tank 32 is to sequentially receive and blend measured amounts of the liquid ingredients and dry ingredients.

For example vessels are provided connected to tank 32 by suitable piping for introducing such liquid or fluent ingredients as shortening, liquid sugar, molasses, corn syrup, honey or the like. Two such vessels 35 and 36 are shown for purposes of illustration containing shortening and molasses respectively, and these vessels may be suitably heated to increase the viscosity of the ingredient to make it more flowable.

Vessel 35 is connected by pipe 37 to discharge into the top of tank 32. Pipe 37 contains a pump 38 driven by an electric motor 39, and downstream of the pump contains a displacement type meter 41 which is operatively connected to a settable control device 42 electrically connected to control motor 39 so that, as will appear in connection with FIGURE 2, motor 39 may be activated to start pumping liquid from vessel when device 42 is set and motor 39 is deenergized when meter 41 has passed a predetermined quantity of the liquid, here shortening.

Similarly vessel 36 is connected by pipe 43 to discharge into the top of tank 32, pipe 43 containing pump 44 driven by motor 45, and a displacement meter 46 operatively connected to a settable control device 47 electrically connected to motor 45. Thus device 47 may be set to start motor 45 and shut it off after meter 46 passes a predetermined amount of molasses. Since meters 41 and 46 are of the positive displacement type they serve as valves to stop liquid flow in the pipes when the preset quantity is delivered.

Water is introduced into tank 32 by means of a main 48 that contains a displacement type meter 49. Main 48 is connected to three sources of supply water at different temperatures and valve and mixing arrangements are provided for selectively supplying water at desired temperatures and at selected times during the different stages of the process.

A chilled water tank 50 which may be kept filled by a suitable float valve controlled inlet has a refrigerating coil 51. A closed pipe circuit 52 containing a pump 53 driven by a motor 54 constantly circulates the water of tank 50 to provide in pipe 52 a source of uniformly chilled water which is connected by pipe 55 to the main 48. A normally closed solenoid valve 56 is provided in pipe 55.

The usual cold water inlet supply pipe is shown at 57, and the usual domestic hot water supply pipe is shown at 58. Two mixing valves 59 and 61 are provided in parallel between pipes 57 and 58 and these are adjustable to obtain proportionate mixing of the water from the different temperature sources to provide a cool water source in pipe 63 that is connected to main 48, and a warm water source pipe 62 connected to main 48. Pipe 63 contains a normally closed solenoid valve 64, and pipe 62 contains a normally closed solenoid valve 65.

The selection and control of the different temperature water sources originates in a suitable switching unit 66 that is responsive to contact of liquid with spaced contacts on liquid level probe 67 in tank 32 as will appear in the description of FIGURE 2.

The horizontal passage through device 29 is connected by pipe 68 to the inlet of a pump 69 driven by electric motor 71, and the pump outlet pipe 72 leads to the dough mixers as will appear. Between the pump and the dough mixers pipe 72 is connected by return pipe 73 back to tank 32. Pipe 73 contains a normally closed solenoid recirculation valve 74.

Two dough mixers 75 and 76 are shown by way of illustration and they have flour inlets 77 and 78 respectively through which measured amounts of flour are supplied to be eventually mixed there with the contents pumped from tank 32. Pipe 72 is connected to pipes 79 and 81 containing normally closed solenoid valves 82 and 83 respectively.

The timed operation of the foregoing apparatus will be described in connection with the electric wiring diagram of FIGURE 2.

The electric lines 84 and 85 are the usual 110–120 volt input source, and a manual master control switch 86 is provided in line 84. An amber signal lamp 87 on a control panel (not shown) lights up when the switch 86 is closed. The control unit 88 of weigh device 24 is energized when switch 86 is closed.

In order to prepare the apparatus for automatic operation there are certain presetting operations of the controls that must be made. The switches 90, 91, 92 and 93 are closed and the operation of closing these switches automatically at the same time opens suitably coupled switches 90A, 91A, 92A and 93A respectively. Control unit 88 is so devised as to open switches 90, 91, 92 and 93 in order each when the preset weights of dry ingredients from bins 11, 12, 13 and 14 respectively are attained. All of switches 90—93, or any one of them, or any two or three of them in combination, may be closed to result in desired dry ingredient mixtures. For example by leaving switch 91 open, no corn sugar is supplied to hopper 27.

Switches 94, 95 and 96 are closed. With switch 94 closed, meter control device 47 is preset for the desired amount of liquid ingredient to be supplied, here molasses. This preset operation closes the control switch 97 for pump motor 45 and this switch 97 will open to stop pump 44 when the measured amount of fluid has passed through meter 46. Similarly when switches 95 and 96 are closed the switches 98 and 99 of two other circuits leading to two other liquid ingredient pump motors (not shown in FIGURE 1) like that at 45 are closed.

Timer 100 is set for the required period of operation of agitator motor 34. Mixing valves 59 and 61 are set to deliver warm water at about 90° F. and cold water at about 60° F. respectively. The meter 49 in main 48 is set to pass the required total amount of water, and the selector switch 122 is set to connect either of solenoid valves 56 or 64 for automatic opening at the proper time depending upon whether chilled or cold water was desired for the dough mix.

There is thereafter no need to change the foregoing settings except to change the formula for the product mixture.

After the foregoing setting operations are accomplished starter switch 101 is manually closed momentarily and this closes the circuit through normally closed switch 102 to main relay 103 that has a signal lamp 104 in parallel. Relay 103 has four normally open contacts 103A, 103B, 103C and 103D, and these are closed when relay 103 is thus energized, and held closed by closure of contact 103A.

Closing of contact 103B closes the circuit to and through normally closed contacts 107C and 105A to coil 106 of solenoid valve 65, which opens valve 65 to start flow of warm water, usually about 90° F., into the tank 32. The temperature of this water has already been preset at valve 59. Closing of contact 103B also closes the circuit to coil 109 of the recirculating valve solenoid 74 to open valve 74.

Contact 107C is one of the three contacts of the pump out relay 107, and contact 105A is the lower water level contact of probe 67 in tank 32. When the water level in the tank reaches contact 105A the latter is opened to deenergize solenoid coil 106 and close valve 65 to stop the supply of warm water.

Opening of probe contact 105A automatically causes probe switch 105 to close which energizes the starter coil 108 of pump motor 71 and when the pump starts it closes auxiliary contact 108A of starter 108 to bypass probe contact 105, thus making the continued operation of pump 69 independent of liquid level in tank 32.

With pump 69 now running and valve 74 open, the warm water is continuously recirculated from tank 32 through pipe 31, device 29, pipe 68, pump 69, pipe 72, valve 74 and return pipe 73.

Simultaneously with opening of warm water valve 65 starter coil 111 of pump motor 39 is energized through contact 112 which was closed when meter 41 was preset to pass the measured amount of shortening. This starts the delivery of shortening from vessel 35 through pump 38, pipe 37 and meter 41 into the tank 32. Usually the shortening is warm, about 90° F. When the required amount of shortening has passed, meter 41 will open contact 112 to deenergize motor 39 and stop pump 38.

At this point the warm water and shortening are mixing and continuously recirculating in the above described recirculation circuit for tank 32.

A second normally open starter contact 108B is also closed when recirculation pump 69 is started, the circuit being completed through contact 108B, switch 94 which was closed when meter 46 was set to pass the required amount of molasses and contact 97 to the coil 114 of the starting unit 115 for pump motor 45. Now pump 44 starts delivering the molasses component through pipe 43 and meter 46 into tank 32, and when the preset quantity has passed meter 46 contact 97 is opened to stop pump 44. Similarly if other liquid ingredients are to be supplied their respective pump starter coils 116 and 117 are simultaneously energized. It will be understood that these other liquid ingredients would be added into tank 32 like and simultaneously with the warm water, shortening and molasses and each cut off when the measured amounts had been delivered.

At this point the warm water, shortening, molasses and any other liquid ingredients are being continuously recirculated by pump 69 through the closed recirculation circuit including tank 32 so that the liquid ingredients all become thoroughly emulsified and mixed and the shortening and other viscous ingredients are kept from resolidifying or settling.

When contact 108B closes, time delay relay 118 is also energized. After a preset time delay, which is long enough for all of the liquid ingredients to enter tank 32 and the recirculation circuit above described, the relay contact 118A closes to energize line 119 to automatically initiate the dry ingredient measuring and feed operations. Closing of contact 118A also completes a circuit through normally closed upper probe contact 121 to the blade of selector switch 122. In the illustrated switch position the circuit is connected to coil 123 of solenoid valve 64 which opens to start the flow of cold water at about 50–60° F. into the tank 32 according to the setting of valve 61. The liquid level now rises in tank 32 until it reaches and opens upper probe contact 121 to thereby deenergize and reclose valve 64 and shut off the supply of cold water. It will be appreciated that probe contact 121 is located sufficiently high that it remains above the liquid level attained by adding the shortening, molasses and other liquid ingredients. This almost fills the tank and provides an adequate amount of liquid to produce a fluent mixture with the dry ingredients, and it tempers the entire liquid to the proper solution and mixing temperature.

Should the mix be such that a colder solution temperature is desired, selector switch 122 is set to connect coil 124 of solenoid valve 56 into circuit whereby chilled water at about 40–50° F. is added into the tank until probe contact 121 opens. This selector switch 122 is usually a seasonal control with chilled water being added in the summer.

The dry ingredient feed preferably automatically starts at the same time that the cold or chilled water starts flowing. As pointed out above closing of contact 118A energized line 119 and established a circuit through the preset closed weight responsive switch 90 and the actuating coil 125 for operation of feeder conveyor 19 to the accumulator 23. This starts the delivery of cane sugar to weigh device 24 and as soon as the present weight is reached, weight responsive switch 90 opens to disable feeder 19, and the weighed cane sugar is dumped into hopper 27.

When switch 90 opens it automatically closes switch 90A, and this establishes a circuit through preset closed weight responsive switch 91 to actuating coil 126 of feeder 20 and the delivery of corn sugar starts into weigher 24.

As soon as the preset weight is reached the weight responsive switch 91 opens to stop delivery from feeder 20 and the weighed corn sugar component is dumped into hopper 27.

When switch 91 opens it automatically closes switch 91A and establishes a circuit through preset closed switch 92 and the actuating coil 127 of feeder 21 to start delivery of salt to weigher 24. As soon as the preset weight is reached the weight responsive switch 92 opens to inactivate feeder 21 and the weighed salt component is dumped into hopper 27.

When switch 92 opens it automatically closes switch 92A and establishes a circuit through preset closed switch 93 and actuating coil 128 of feeder 22 to start delivery of powdered milk to the weigher 24. As soon as the preset weight is reached the weight responsive switch 93 opens to inactivate feeder 22 and the weighed powdered milk component is dumped into hopper 27.

When switch 93 opens it automatically closes switch 93A to energize agitator or homogenizer motor 34 whereby the contents of tank 32 are now subjected to agitation as well as recirculation.

The reduced lower end of hopper 27 is open through tube 28 into combining device 29 so that it empties itself gradually of dry ingredients while they are being supplied to it. These dry ingredients are effectively gradually educed or entrained into the stream of liquid flowing through the horizontal passage of device 29 until all of the contents of hopper 27 have been taken up and incorporated into the recirculating stream and the agitated contents of tank 32, so that the dry and liquid ingredients are thoroughly mixed and homogenized into a flowable slurry.

As noted before, if any dry ingredient is not desired, its corresponding switch 90—93 is not closed and set which means that its corresponding switch 90A—93A remains open, and the foregoing dry ingredient feed takes place as described automatically bypassing the non-set feeder switch. Similarly any liquid ingredient may be omitted by not closing the corresponding switch.

When the agitator motor 34 is energized it closes switch 34A to complete a circuit energizing the preset timer 100. The function of timer 100 is to control the time of mechanical mixing in tank 32 and at the end of the preset period timer contact 100A closes to establish a circuit through relay contact 103D which was closed when relay 103 was energized and ignite the ready signal lamp 130 for mixer 75.

When this lamp 130 ignites the operator knows that the automatic mixing of the dry and liquid ingredients is complete and that the slurry is ready for introduction into the dough mixer. The operator then closes switch 131 to energize the pump out relay 107, and this relay is held energized by closing of relay contact 107B. Closing of relay contact 107A establishes a circuit through relay contact 103C closed when relay 103 of mixer 75 was energized to energize coil 132 of the normally closed solenoid valve 82 for opening that valve to connect pipe 79 to slurry supply pipe 72. Switch 131' is parallel to 131 for dual control.

At the same time that contact 107A closed, normally closed relay contact 107C was opened and this deenergized coil 109 and closed the recirculation solenoid valve 74 so that all of the slurry being pumped out of tank 32 flows toward mixer 75.

As the liquid level lowers in tank 32 upper probe contact 121 recloses to complete the circuit through selector switch 122 and coil 123 to again start the flow of cold water into tank 32 (or if switch 122 is in the alternative position chilled water is supplied to the tank). This flow of cold water continues until the total amount of water for which meter 49 has been preset is supplied and the meter then trips to cut off further water flow. Besides introducing the balance of the total controlled temperature water needed for the mix this subsequent introduction of cold water serves to clean tank 32 and agitator 33 and help flush the pipes to mixer 75. It will be noted that when the liquid level in tank 32 drops below lower probe contact 105A the pump 69 is maintained in operation due to closed contact 108A.

When the tank 32 becomes empty pump 69 loses suction to indicate that the entire flowable mixture has been pumped into mixer 75. The operator, noting this, opens the switch 102 to deenergize the main control relay 103 and thus open relay contacts 103A, 103B, 103C and 103D. This stops pump 69, opens contact 108B to deenergize the time delay relay 118, opens relay contact 118A to effect reset of timer 100 and cause cold water supply solenoid valve 123 to close.

Switches 132 and 133 are provided to open valves 56, 64 and 65 for purposes of testing the source water temperatures. These are usually spring biased to close when released and the test sample is taken.

When it is desired to pump the contents of tank 32 into dough mixer 76, instead of closing switch 101 as above described the operator closes switch 135 which energizes the dough mixer relay 136 having a signal lamp 137 in parallel. This closes normally open relay contact 136A which bypasses switch 135 and effects the same control operations. Closing of relay contact 136B initiates warm water flow, and closing of relay contact 136C energizes the coil 139 of the solenoid valve 83 at dough mixer to allow the eventual delivery of the slurry to mixer 76. All other operations are identical with those effected in mixing the dry and liquid ingredients and pumping the slurry into mixer 75, parallel relay contacts (not shown) being provided where necessary. Closing of relay contact 136D lights signal lamp 138.

The flour is automatically weighed and introduced into the selected dough mixer at the proper time. To my knowledge this is the first automatic system wherein the water is mixed with the ingredients before combination with the flour. The usual practice was to introduce the water into the dough mixers along with the flour and separately from the ingredient components.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a process for making bakery and like products composed essentially of mixtures of flour, a plurality of other selected dry ingredients, water and a plurality of other selected liquid ingredients, the steps of selectively and automatically feeding measured quantities of said other liquid ingredients into a mixing chamber together with a measured quantity of warm water that is a portion only of the total water required for the process, agitating and circulating said other liquid ingredients and warm water for a predetermined period for thorough mixing, then selectively and automatically feeding measured quantities of said other selected dry ingredients into said chamber together with a measured quantity of cooler water this is also a portion only of the total water required for the process, continuing said agitation and circulation until the introduced water and other selected liquid and dry ingredients are combined into a substantially homogeneous flowable slurry, and then combining said slurry with all of the flour required for the process together with cool water in an amount which when added to that already introduced supplies the balance of the total water required for the process.

2. In the process defined in claim 1, said steps of agitation and circulation consisting essentially of pumping the contents of the chamber into a conduit system that is connected to discharge back into said chamber so that effective recirculation of said contents out of and into the chamber is effected for thorough mixing.

3. In the process defined in claim 2, said other selected dry ingredients being introduced into said conduit system outside the chamber.

4. In the process defined in claim 1, at least one of said quantities of cool water being selectively chilled for producing a controlled lower slurry temperature.

5. In the process defined in claim 1, said last-named step being effected by pumping the slurry out of said chamber into a dough mixer or the like to combine with the flour, and said balance of cool water being introduced into said chamber during withdrawal of the slurry.

References Cited in the file of this patent

UNITED STATES PATENTS

| | | |
|---|---|---|
| 51,659 | Moxey | Dec. 19, 1865 |
| 691,749 | Corby | Jan. 28, 1902 |
| 1,387,693 | Doyle | Aug. 16, 1921 |
| 1,861,803 | Lautergur et al. | June 7, 1932 |
| 2,197,820 | Voss | Apr. 23, 1940 |
| 2,555,902 | Salo et al. | June 5, 1951 |
| 2,737,129 | Johnson et al. | Mar. 6, 1956 |

FOREIGN PATENTS

| | | |
|---|---|---|
| 735,184 | Great Britain | Aug. 17, 1955 |